United States Patent [19]

Morez et al.

[11] 4,032,720
[45] June 28, 1977

[54] INTEGRATED DEMULTIPLEXING CIRCUIT WITH CONTINUOUSLY VARIABLE OUTPUTS

[75] Inventors: Eugene S. Morez, Morton Grove; Douglas R. Moore, Vernon Hills, both of Ill.

[73] Assignee: Norlin Music, Inc., Lincolnwood, Ill.

[22] Filed: June 19, 1975

[21] Appl. No.: 588,331

Related U.S. Application Data

[63] Continuation-in-part of Ser. No. 444,028, Feb. 20, 1974, Pat. No. 3,902,397, which is a continuation of Ser. No. 323,247, Jan. 12, 1973, abandoned.

[52] U.S. Cl. .......................... 179/15 A; 179/15 BL
[51] Int. Cl.² ........................................ H04J 3/04
[58] Field of Search ........ 179/15 A, 15 BL, 15 AP; 340/347.5 H, 147 CV, 184, 185; 307/223 R, 244; 328/96, 97, 152

[56] References Cited

UNITED STATES PATENTS

| | | | |
|---|---|---|---|
| 3,059,228 | 10/1962 | Beck | 179/15 AP |
| 3,419,819 | 12/1968 | Murakami | 179/15 AP |
| 3,820,112 | 6/1974 | Roth | 340/347.5 H X |
| 3,855,419 | 12/1974 | Hurford | 179/15 A |
| 3,909,811 | 9/1975 | Adler | 179/15 BL |

*Primary Examiner*—David L. Stewart
*Attorney, Agent, or Firm*—Hill, Gross, Simpson, Van Santen, Steadman, Chiara & Simpson

[57] ABSTRACT

An integrated circuit has a shift register, driven by a source of clock pulses, for sequentially energizing each of a set of selectively activated switches. Each of the switches connects an analog input signal to the input of an individual sample-and-hold unit, the outputs of which are available at output terminals of the circuit. The outputs of the sample-and-hold units represent the amplitude of the analog input signal, sampled at the rate of the clock pulses applied to the shift register. The analog input signals of selected outputs are modified selectively.

14 Claims, 4 Drawing Figures

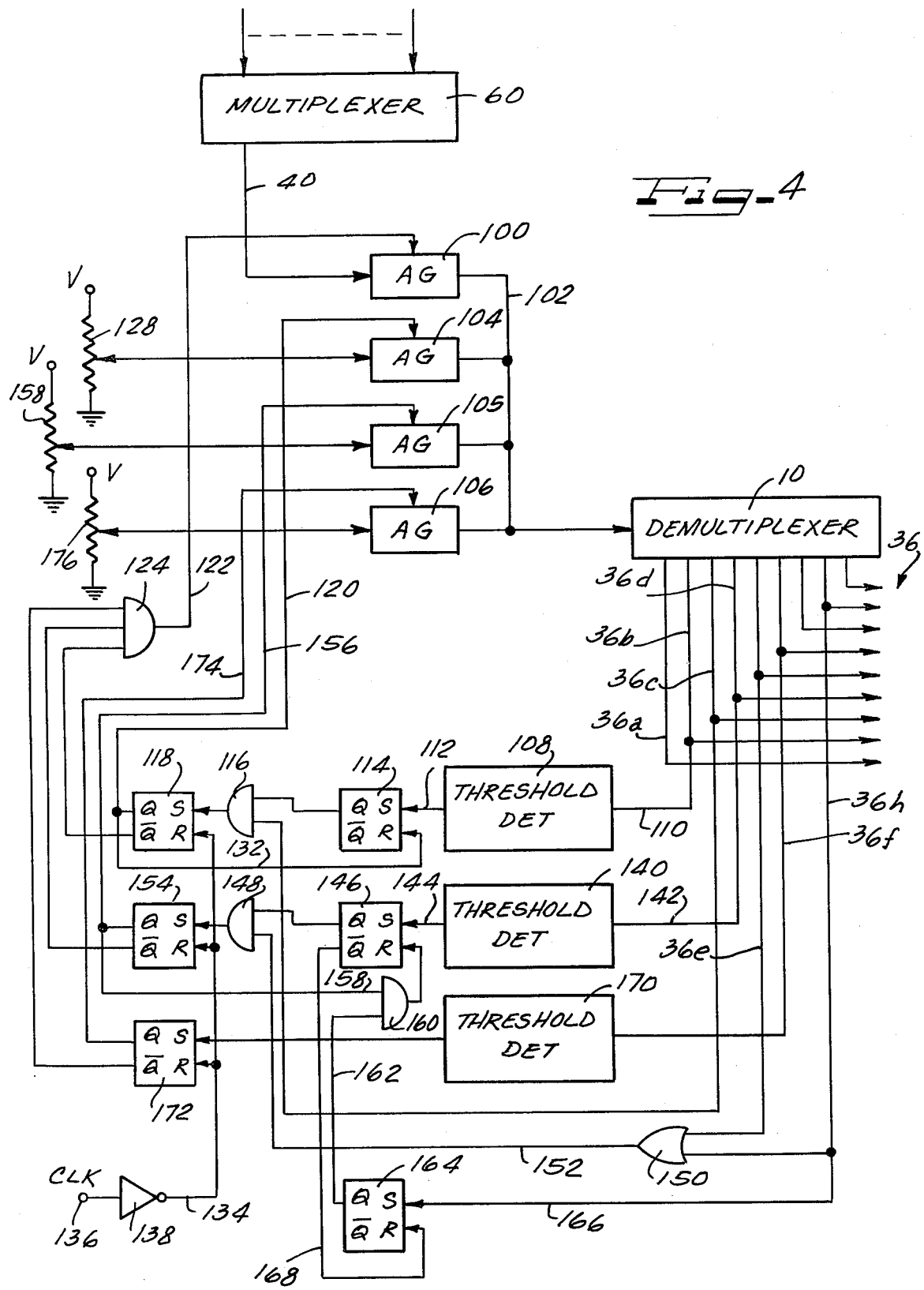

INTEGRATED DEMULTIPLEXING CIRCUIT WITH CONTINUOUSLY VARIABLE OUTPUTS

This is a continuation-in-part of my copending application Ser. No. 444,028, filed Feb. 20, 1974, now U.S. Pat. No. 3,902,397, issued Sept. 2, 1975, for "Electronic Musical Instrument With Variable Amplitude Time Encoded Pulses," which is a continuation of Ser. No. 323,247, filed Jan. 12, 1973, now abandoned.

BACKGROUND OF THE INVENTION

1. Field of the Invention

The present invention relates to integrated circuits, and more particularly to integrated circuits for performing a demultiplexing operation.

2. The Prior Art

In digital systems, demultiplexing circuits are common, and function effectively to distribute data available on a single input line to a plurality of output lines, each of which is selected in time sequence. Typically in such applications the input data is binary in character, so that a bit is either present or not present each time one of the output lines is selected by the demultiplexing circuit.

There are many applications in which this technique can feasibly be employed to analyze or demultiplex an analog signal, meaning a signal which is capable of representing more than a binary "on" or "off" function. With previously known circuitry, however, it has not been possible economically to perform such a function, because it has been necessary to provide extensive filtering and amplification of the demultiplexed output channels.

It is accordingly desirable to provide an inexpensive and efficient apparatus for applying demultiplexing techniques to an analog signal in order to manifest voltage values corresponding to the instantaneous amplitudes of an analog input signal at sequential times, without requiring extensive filtering.

SUMMARY OF THE INVENTION

It is a principal object of the present invention to provide an inexpensive and efficient apparatus for performing a demultiplexing operation on an analog input signal and manifesting, on a plurality of outputs, voltage levels corresponding to the instantaneous amplitudes of the analog input signal at a variety of sampling points.

Another object of the present invention is to provide a circuit for performing such a demultiplexing function which is capable of being constructed in integrated circuit form.

Another object of the present invention is to provide apparatus for carrying out the demultiplexing function which requires a minimum of external connections to other apparatus, and minimum filtering.

A further object of the present invention is to provide means for effectively modifying one or more selected demultiplex output channels.

These and other objects and advantages of the present invention will become manifest by an examination of the accompanying drawings and the following description.

In one embodiment of the present invention there is provided a demultiplexing circuit incorporating a multi-stage shift register adapted to be connected to a source of clock pulses for energizing one stage at a time, a plurality of switches connected individually to stages of the shift register for mutually exclusive operation thereby, an input line connected to all of the switches, a plurality of sample-and-hold units, each individually connected to one of the switches for receiving an analog signal from the input line when its respective switch is operated, and output means connected with each of said sample-and-hold units for manifesting an output voltage corresponding to the instantaneous amplitude of the analog signal at the time such switch is operated.

A typical application of the present invention is illustrated and described in my aforesaid copending application, in which the demultiplexing circuit of the present invention is employed in an electronic musical instrument to develop drive signals for a plurality of keyers, in response to the instantaneous amplitude of an analog signal developed from a multiplexer associated with the keyboard of the instrument.

BRIEF DESCRIPTION OF THE DRAWINGS

Reference will now be made to the accompanying drawings, in which:

FIG. 4 is a functional block diagram of a further embodiment of the invention.

DESCRIPTION OF THE PREFERRED EMBODIMENT

Figure 1:
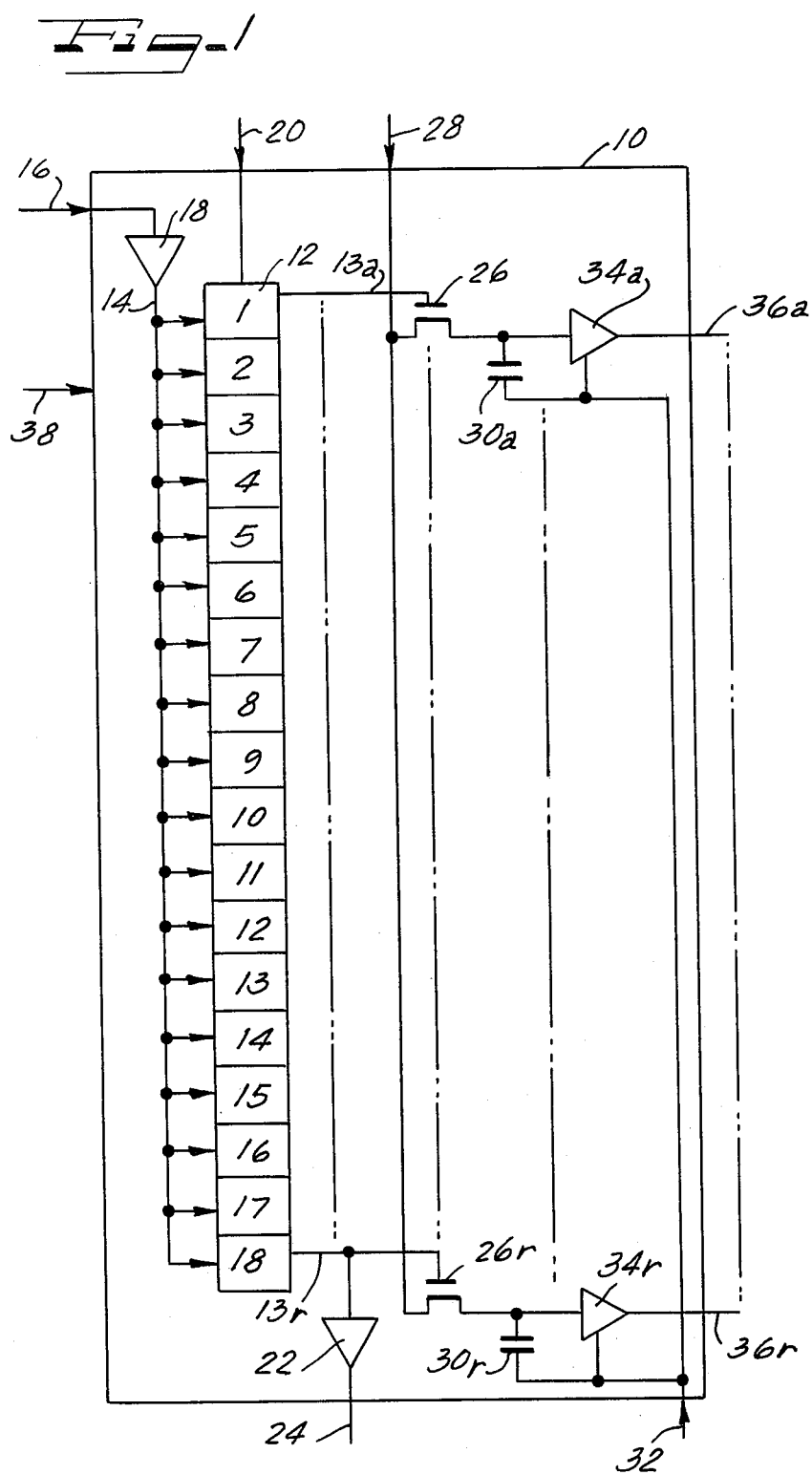
FIG. 1 is a functional block diagram of an integrated circuit incorporating an illustrative embodiment of the present invention.

FIG. 1 illustrates a circuit incorporating an illustrative embodiment of the present invention in the form of an integrated circuit 10 having 24 terminals. The circuit 10 includes a shift register 12, which, in the embodiment illustrated in FIG. 1, has eighteen stages, each of which is connected to a clock line 14. A clock input terminal 16 is connected to an amplifier 18, which provides clock pulses on the line 14. A source of clock pulses (not shown) is connected to the terminal 16.

The first stage of shift register 12 is connected to a start pulse terminal 20, and a pulse appearing at the terminal 20 serves to change the state of the first stage of the shift register 12, after which successive clock pulses applied to the terminal 16 cause the operated stage of the shift register to propagate down the length of the shift register. An amplifier 22 is connected to the output of the last (eighteenth) stage of the shift register 12, and its output is connected to a carry-out terminal 24.

Each of the eighteen stages of the shift register 12 has an individual output, which are each connected to the gate input of an individual switch of a set of 18 switches 26a–26r. The switches 26a–26r are of the conventional MOS type, and typically include an FET, the gate terminal of which is connected to the output of one stage of the shift register 12. The drain and source terminals of each switch are connected between a common analog input line 28 and one terminal of an individual capacitor of a set of eighteen capacitors 30a–30r. The other terminal of each of the capacitors 30a–30r is connected to a source of reference potential which is applied to the circuit 10 through a $V_{dd}$ terminal 32.

Each of the capacitors 30a–30r is connected across the input of an individual buffer amplifier of a set of eighteen buffer amplifiers 34a–34r, the output of which is connected to an individual output line 36a–36r. The amplifiers 34a–34r are preferably of a type which has a relatively high input impedance, to prevent discharging the capacitors 30a–30r. The amplifiers 34a–34r preferably have a relatively low output impedance, 500 ohms or less, so they produce ample current to drive a utilization device connected to any of the output terminals 36a–36r. Each of the switches 26a–26r has a relatively low impedance when it is operated by a signal from its associated stage of the shift register 12, and otherwise maintains a relatively high impedance between its drain and source terminals, to prevent discharging its capacitor. A source of power is provided for the amplifiers 18, 22 and 34 for the shift register 12 through a $V_{ss}$ terminal 38.

As the details of construction of the components of the circuit illustrated in FIG. 1 are well known to those skilled in the art, it is not necessary to describe each of them in detail.

In operation, the clock pulses applied to the line 16 cause the operated stage of the shift register to travel down the length of the shift register, at the rate of one stage per clock pulse. Each shift register stage, as it becomes operated, actuates its respective switch 26, so that the switch becomes effective to charge its associated capacitor 30 to the instantaneous voltage level on the input line 28. Such voltage level is stored on the capacitor 30 (and manifested on the output line 36) until the next time that the switch is again operated, during the succeeding cycle. The capacitor 30, in association with its switch 26 and its buffer amplifier 34, forms a sample-and-hold unit. There is an identical sample-and-hold unit for each stage of the shift register 12.

Figure 2:
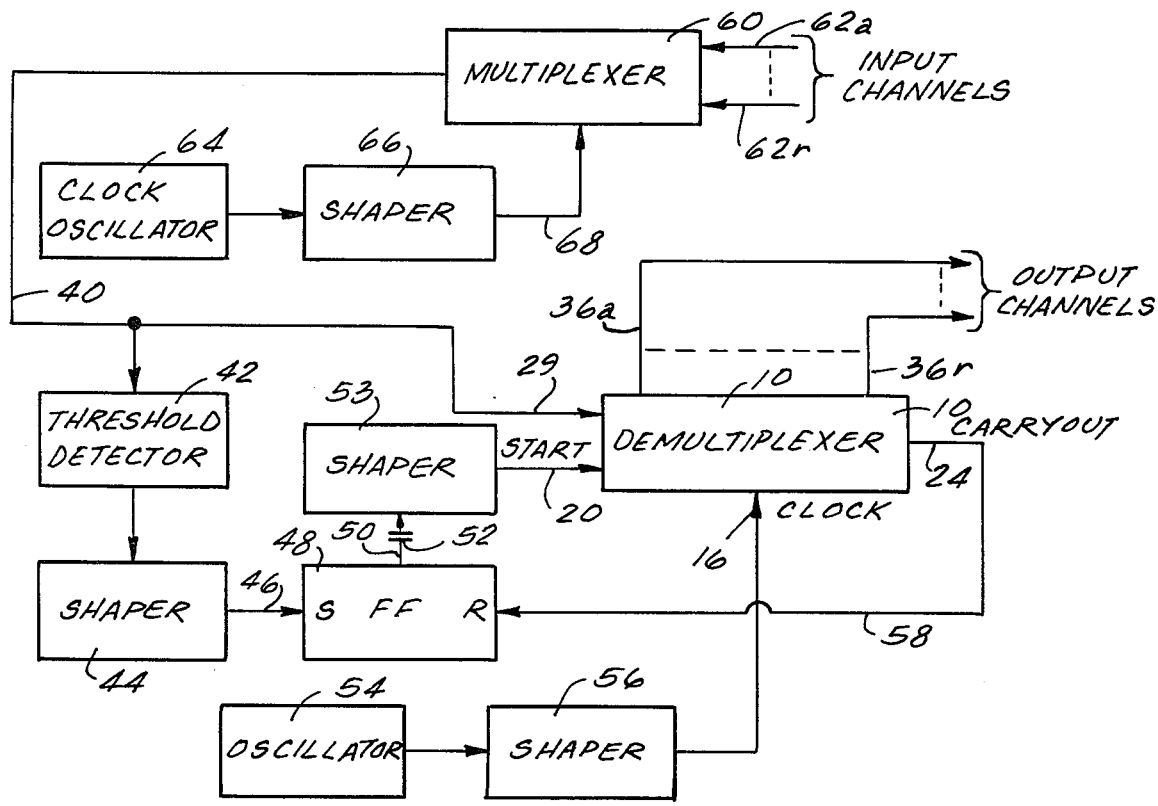
FIGS. 2 and 3 are functional block diagrams illustrating applications of the circuit of FIG. 1.

A typical application of the demultiplexer of the present invention is illustrated in FIG. 2. The demultiplexer 10 is shown in functional block form, but it is understood that the block 10 of FIG. 2 includes the entire circuitry illustrated in FIG. 1, including the voltage supply terminals which are omitted from FIG. 2, and the voltage sources connected to such terminals. An analog input signal arrives over a transmission line 40, and is applied to the analog input terminal 29. In the embodiment of FIG. 2, this signal represents the output of a multiplexer 60. The leading edge of the signal applied to the line 40 is detected by a threshold detector 42, the output of which is connected to a shaper 44, which produces a rectangular pulse. The shaped pulse is transmitted over a line 46 to the set input of a flip-flop 48, which produces a change in potential at an output line 50. The line 50 is connected through a capacitor 52 and a shaper 53 to the start terminal 20, to operate the first stage of the shift register of the demultiplexer 10, by changing its state. A clock oscillator 54 has its output connected to a shaper 56, and the output of the shaper is connected to the clock input terminal 16, to furnish clock pulses for the operation of successive stages of the shift register at the rate established by the frequency of the oscillator 54. A carry-out pulse is ultimately produced at the terminal 24, and this is connected by a line 58 to the reset input of the flip-flop 48, which resets the flip-flop 48 to its initial condition. Thereafter the flip-flop 48 can produce a subsequent start pulse, when another analog input signal is transmitted over the line 40 and detected by the threshold detector 42.

The analog input signal on the line 40 may consist of a single pulse having an arbitrary shape, formed by multiplexing a plurality of analog signal channels. The shape of the pulse is such that its amplitude, at any instant, is equal to the amplitude of an analog signal channel being sampled by the multiplexer at the time. It may have a specific voltage level for each discrete time interval of its duration, such voltage level corresponding to the instantaneous amplitude of one of the analog input channels.

Means for producing such a pulse incorporates a multiplexer 60 having connected thereto a plurality of analog input channels 62a–62r. A clock oscillator 64 is provided, connected to a shaper 66, for producing rectangular pulses on the line 68 for the purpose of driving the multiplexer 60. It will be appreciated that the oscillators 54 and 64 oscillate at the same frequency, in phase with each other, so that the information which is multiplexed by the multiplexer 60 is properly decoded by the demultiplexer 10.

No specific arrangement for synchronizing the two oscillators 54 and 64 is shown, because many such arrangements are known in the prior art. Alternatively, a single oscillator may be used to furnish clock pulses to both the multiplexer 60 and the demultiplexer 10.

When the oscillator 64 is desired to operate continuously, to produce a continuous chain of multiplex signals on the transmission line 40, the demultiplexer 10 must also run continuously, and, to accomplish this, the carry-out terminal 24 is connected to the start terminal 20, either directly or through an OR gate (not shown), which receives the signal from the terminal 24 on one input and an initial start signal from the shaper 53 on a second input. Synchronizing means (not shown) is, in this case, provided to provide the initial start signal to the shaper 53, and insures synchronization of the multiplexer and demultiplexer units. The threshold detector 42, the shaper 44 and the flip-flop 48 are not required in this arrangement.

An advantage of the demultiplexer of the present invention is that rapidly repeating cycles of operation of the multiplexer are not required in order to establish relatively steady and continuous outputs at the output channels. The sample-and-hold units within the demultiplexer 10 maintain the voltage levels at the output channels relatively constant. Therefore the multiplexer 60 can operate intermittently, producing periodic analog pulses over the transmission line 40. Accordingly, it is possible to use the transmission line 40 for other communications tasks when it is not required for transmission between the multiplexer 60 and the demultiplexer 10.

The present invention is also advantageous when the multiplexing is continuous, because the charge on each of the capacitors 30a–30r is renewed during each cycle, and there is little tendency for the output voltages on the various output channels to decay. A relatively smooth output voltage is presented to each of the output channels, because the level of the voltage changes only in response to changes of the signals provided to the input channels 62a–62r, and is not required to change periodically to accommodate the demultiplexing operation. Accordingly, less filtering is required to eliminate frequency components in the output signals which result from step functions occurring in the output channels, representative of a change in voltage level, in a channel, between cycles.

Figure 3:
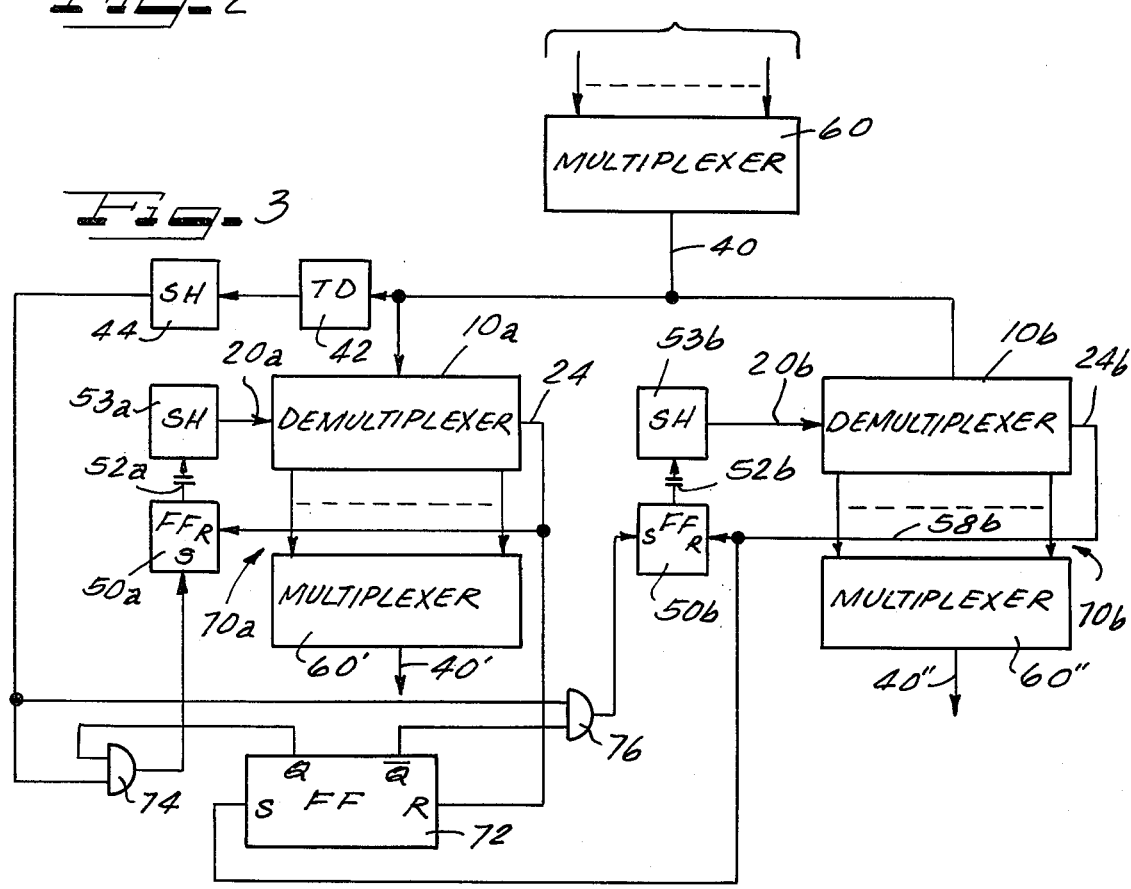

Another use of the present invention is in connection with interfaces between relatively high speed and relatively slow speed transmission lines. Such an application is shown in FIG. 3. The line 40, connected to the output of the multiplexer 60, is a high speed transmission line, and is connected to two demultiplexers 10a and 10 b. Both of the demultiplexers 10a and 10b are constructed like the demultiplexer described above, and operate to furnish signals to a plurality of output lines 70a and 70b, respectively. The lines 70a are connected to the channel inputs of a further multiplexer 60', which produces a multiplexer output on a slow speed transmission line 40'. Similarly, the output 70b are connected to the channel inputs of a further multiplexer 60'', which produces a multiplexed output on a second low speed transmission line 40''.

Multiplexed signals are demultiplexed alternately by the demultiplexers 10a and 10b, under the control of synchronizing apparatus, described hereinafter.

Because the line 40 is a high speed transmission line, all of the information can be transmitted over it, by means of the multiplexer 60. Since the lines 40' and 40'' are low speed transmission lines, they each carry only half as much information. Even though the two demultiplexers are operated at different times, each continuously manifests the output voltage for each channel, and so the multiplexers 60' and 60'' are not required to be synchronized with the multiplexer 60 or with each other. Each of the multiplexers 60' and 60'' can operate as if their channel inputs were connected to the original voltage sources, instead of to demultiplexed channel outputs. In addition, no filters are required for any of the multiplexers and demultiplexers of FIGS. 2 and 3.

The demultiplexers 10a and 10b are operated alternately under the control of a flip-flop 72, which is set or reset on the completion of operation of both of the demultiplexers, to manifest a signal which enables the other to operate next.

When the flip-flop 72 is set, the Q output is high, and an AND gate 74 passes a pulse from the shaper 44 to the set input of a flip-flop 50a, which then produces a pulse which is conducted through a capacitor 52a, and shaped by a shaper 53a, to provide a start pulse to the demultiplexer 10a. The carry-out pulse on the terminal 24a is conducted over the line 58a to reset the flip-flop 50a, and also resets the flip-flop 72.

When the flip-flop 72 is reset, the $\overline{Q}$ output goes high and enables an AND gate 76, so that the next pulse from the shaper 44 is applied to the set input of the flip-flop 50b associated with the demultiplexer 10b. The demultiplexer 10b then operates in the same manner as has been described for the demultiplexer 10a. The operation continues, with the demultiplexers operating alternately, as long as pulses are transmitted over the line 40. Although the demultiplexer of the present invention is limited to 18 channels, in single integrated circuit having 24 terminals, it will be appreciated that two or more chips can be connected together, with the carry-out terminal of one being connected to the start terminal of the next, to form a demultiplexer for any desired number of channels.

The demultiplexer of the present invention can also be used in a pulse analyzer application. The start of the pulse starts operation of the demultiplexer 10 of FIG. 2, and the height of the pulse at spaced times is manifested on the output channels 36a–36r. The output channels 36a–36r may be connected to a display so that the pulse may be illustrated in static form. For example, if each of the lines 36a–36r is connected to the input of a bar graph display device, the shape of the pulse may be illustrated by a series of side-by-side bar graphs. If an oscilloscope type display is desired, the outputs on the lines 36a–36r may be multiplexed or otherwise sampled successively and repetitively, in synchronism with the sweep of the CRT beam. As the outputs on the lines 36a–36r are continuously manifested, there is no need to synchronize the CRT sweep with the time of occurrence of the pulse being analyzed, or with operation of the demultiplexer. By choosing an appropriate frequency for the clock oscillator 54, slow or fast pulses may be analyzed, using the same display equipment.

Referring now to FIG. 4, there is shown a further embodiment of the present invention, by which selected outputs of the demultiplexer 10 may be modified in a predetermined way. As in the previous embodiments, the multiplexer 60 produces a multiplexed output on a line 40. The line 40 is connected to the input of an analog gate 100, which is normally operative to pass its input to an output line 102. The output line 102 is connected to the input of the demultiplexer 10, which produces the output signals 36 in the manner described above.

A plurality of further analog gates 104–106 is provided for modifying the signals on certain output channels 36. The analog gates 100 and 104–106 are controlled by logic, which will now be described. The logic incorporates three separate portions, for effecting three different types of modification on selected signals of the output channels 36.

A first section operates, in response to a signal on one of the output channels 36, the output of a different output channel 36 modified to manifest a selected voltage level. This section incorporates a threshold detector 108, having its input connected by a line 110 to a selected output channel 36b of the demultiplexer 10. When a signal occurs on the line 36b, the threshold detector 108 detects a signal and produces an output signal on an output line 112 which is connected to the set input of an RS flip-flop 114. Accordingly, the flip-flop 114 is set whenever a pulse exceeding the threshold of the threshold detector 108 appears on the line 36b.

When the flip-flop 114 is set, a relatively high level is manifested on its Q output, and this output is connected to one input of an AND gate 116. The AND gate 116 has its other input connected to another output line 36c, and accordingly produces an output, after the setting of the flip-flop 114, when a signal is manifested on the line 36c.

The output of the AND gate 116 is connected to the set input of an RS flip-flop 118, so that the flip-flop 118 is set when a signal is detected on the line 36c, after a signal has previously been detected on the line 36b. The Q output of the flip-flop 118 is connected by a line 120 to the control input of the analog gate 104, so that the analog gate 104 is then rendered effective.

The analog gate 100, which is normally effective, receives its control signal over a line 122 from the output of an AND gate 124. One input of the AND gate 124 is from the $\overline{Q}$ output of the flip-flop 118, so whenever the flip-flop 118 is set, the AND gate 124 is disabled, and a low voltage level appears on the line 122 which disables the analog gate 100, interrupting the normal path between the line 40 and the line 102.

When the analog gate 104 is enabled, a path is connected from a voltage divider to the output line 122. The voltage divider comprises a potentiometer 128 connected between ground and a terminal 130 to which a suitable reference voltage is connected. The setting of the potentiometer 128 determines the voltage applied through the analog gate 104 to the output line 102, and thence to the demultiplexer 10.

A line 132 is connected from the Q output of the flip-flop 118 and the reset input of the flip-flop 114, so that the flip-flop 114 is reset as soon as the flip-flop 118 is set. The flip-flop 118 is set following the period assigned to the output channel 36c, by a signal on a reset line 134. The line 134 is connected to a terminal 136 which receives clock pulses in synchronism with those which are applied to the demultiplexer 10, as described above, and the terminal 136 is connected through an inverter 138 to the line 134, so that the line 134 goes high at the end of the interval assigned to each separate channel, to reset the flip-flop 118 coincident with the end of the time period assigned to the channel 36c.

Another section of the logic responds to the presence of a signal on one of the channels 36 to modify in like manner a pluarlity of other output channels 36. To accomplish this function a threshold detector 140 is provided and is connected by a line 142 to a channel 36d. When a signal is produced on the channel 36d, the threshold detector 140 detects it, and produces an output signal on a line 144 which is connected to the set input of a flip-flop 146. The Q output of the flip-flop 146 is connected to one input of an AND gate 148, the other input of which is connected to the output of an OR gate 150. The OR gate has its two inputs connected to the lines 36e and 36h, and produces an output signal in response to a signal present on either of the lines 36e or 36h. The output of the OR gate 150 is connected by the line 152 to the other input of the AND gate 148, so that, when the flip-flop 146 is set, a signal appearing on either of the lines 36e or 36h is effective to produce an output signal from the AND gate 148. This output is connected to the set input of a flip-flop 154, having its Q̄ output connected to one terminal of the AND gate 124, and its Q output connected by a line 156 to the control input of an analog gate 105. The signal input of the analog gate 105 is connected to the tap of a potentiometer 158, which is connected between a source voltage and ground, so that the position of the tap of the potentiometer controls the voltage applied to the signal input of the gate 105.

The Q output of the flip-flop 154 is connected by a line 158 through an AND gate 160 to the reset input of the flip-flop 146, so that the flip-flop 146 is reset when the flip-flop 154 operates only if there is also a signal applied to the other input of the AND gate 160. The other input is connected by a line 162 to the Q output of a flip-flop 164, the set input of which is connected by a line 166 to the line 36h. Accordingly, the flip-flop 164 is set only when a signal occurs on the line 36h, after which operates of the flip-flop 154 is effective to reset the flip-flop 146. The Q̄ output of the flip-flop 146 is connected by a line 168 to the reset input of the flip-flop 164, so that it becomes reset as soon as the flip-flop 146 is reset. By this means the flip-flop 146 continues to be set for the interval extending through the time period in which are produced the signals on the output lines 36e and 36h, which need not be consecutive. At the beginning of the period of the signal on the line 36e, and again at the beginning of the period of the signal on the line 36h, the flip-flop 164 is set to modify the input to the demultiplexer 10 during that period only.

The third section of the logic includes a threshold detector 170 for modifying the voltage level manifested on a selected output line. The input of the threshold detector 170 is connected to the line 36f, and detects a signal present on that line to set a flip-flop 172, the set input of which is connected to the output of the threshold detector 170. The Q̄ output of the flip-flop 172 is connected as an additional input to the AND gate 124, so that the analog gate 100 is disabled whenever the flip-flop 172 is set. The Q output of the flip-flop 172 is connected by a line 174 to the control input of the analog gate 106, the signal input of which is connected to the tap of a potentiometer 176, connected between a suitable voltage source and ground. Accordingly, the position of the tap of the potentiometer 176 effects the voltage applied to the demultiplexer 10 through the analog gate 106, during the period of the signal on the line 36f. At the conclusion of this period, a signal appears on the line 134 to reset the flip-flop 172.

The potentiometers 128, 158, and 176 are all merely illustrative of a mechanism for establishing a selected voltage level for selected channels and may be replaced by other means if desired.

Although three different mechanisms for modifying the inputs to the demultiplexer 10 have been illustrated, it will be apparent to those skilled in the art that many additional forms of modification are possible, and that with all of them the output manifested by the demultiplexer 10 is modified in a manner determined by the selected voltage associated with the particular analog gate which is energized during the period of each channel to be modified. Although the modification mechanism illustrated in FIG. 4 is effective during each cycle of operation of the demultiplexer 10, their operation may be intermittent if desired. Following each cycle of operation, the demultiplexer 10 manifests on the output lines 36 a constant voltage level corresponding to the input voltage applied to the input of the demultiplexer 10 during the appropriate period of the last cycle of operation of the demultiplexer.

Other applications of the present invention will no doubt occur to those skilled in the art, who may also make modifications and additions to the apparatus of the present invention, without departing from the essential features of novelty thereof, which are intended to be defined and secured by the appended claims.

What is claimed is:

1. A demultiplexing circuit for providing a plurality of output channels having continuously variable outputs, comprising a shift register having a plurality of stages, means for operating a first stage of said shift register, clock means connected with said shift register for causing said operated stage to propagate down the length of said shift register, a plurality of switches, means connecting each of said switches individually to a single stage of said shift register, each of said switches being operated when its associated stage is operated, means collectively connecting said switches to a source of an analog input signal, a plurality of sample-and-hold means, one for each of said switches, and means individually connecting said switches to said sample-and-hold means, whereby said sample-and-hold means manifests a voltage corresponding to the instantaneous voltage of said analog input signal at the time when its associated switch is operated.

2. Apparatus according to claim 1, including a plurality of output terminals, and means connecting said sample-and-hold devices individually to said output terminals.

3. Apparatus according to claim 1, wherein said circuit is embodied in a single integrated circuit package having a separate output terminal for each of said sample-and-hold means, an input terminal for said first stage, a clock input terminal and an input terminal for said analog signal.

4. Apparatus according to claim 3, including a further output terminal connected to the last stage of said shift register to produce a carry-out pulse.

5. Apparatus according to claim 1, including means for producing an output signal in response to operation of the last stage of said shift register.

6. Apparatus according to claim 1, wherein each of said sample-and-hold devices incorporates a capacitor and an amplifier having a relatively high input impedance and a relatively low output impedance.

7. Apparatus according to claim 1, wherein each of said switches comprises a MOS switch.

8. Apparatus according to claim 1, including means connected to said analog input line for producing a start signal when the voltage level on said analog input line exceeds a predetermined threshold, and means connecting said start signal to the first stage of said shift register for operating said first stage.

9. In a multiplexing-demultiplexing system, including means for providing a multiplexed signal to a transmission line, the combination comprising demultiplexing means connected with said transmission line for continuously manifesting, on a plurality of output terminals, voltage levels corresponding to data received from said transmission line at time encoded positions individually corresponding to said output terminals, and modifying means for selectively modifying inputs to said demultiplexing means at selected times corresponding to selected output terminals.

10. Apparatus according to claim 9, including control means connected to said demultiplexing means and responsive to the presence of a signal at a selected output terminal thereof for producing a control signal, and means for connecting said modifying means with said control means and with said demultiplexing means for modifying the signal manifested at a selected output terminal of said demultiplexing means in response to said control signal.

11. Apparatus according to claim 9, including a voltage source, said demultiplexing means including a plurality of sample-and-hold means, one for each of said output terminals, each of said sample-and-hold means having a data input and a control input, means for connecting the data inputs of all of said sample-and-hold means in common to said transmission line, means connected to said control inputs for successively triggering said sample-and-hold means for sampling and manifesting the instantaneous voltage level of said multiplexed signal on said transmission line, and selectively operable means for disconnecting said multiplexed signal from said sample-and-hold means and for instead connecting said voltage source to said sample-and-hold means.

12. Apparatus according to claim 11, wherein said last named means includes means for selectively disconnecting said transmission line from said sample-and-hold means.

13. Apparatus according to claim 11, wherein said selectively operable means comprises means connected to said demultiplexing means and responsive to a signal on a selected output terminal thereof.

14. Apparatus according to claim 13, including threshold detector means connected with said demultiplexing means and with said selectively operable means for operating said selectively operable means in response to a signal present on a selected output terminal of said demultiplexing means which is greater than a predetermined level.

* * * * *